US012810719B2

(12) United States Patent
Yorkey et al.

(10) Patent No.: US 12,810,719 B2
(45) Date of Patent: Nov. 24, 2026

(54) METHODS AND APPARATUSES FOR DETECTING TAMPERING IN SECURITY SYSTEM

(71) Applicant: Comcast Cable Communications, LLC, Philadelphia, PA (US)

(72) Inventors: David Yorkey, Philadelphia, PA (US); Christopher Stone, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 175 days.

(21) Appl. No.: 18/621,883

(22) Filed: Mar. 29, 2024

(65) Prior Publication Data

US 2025/0308373 A1 Oct. 2, 2025

(51) Int. Cl.
*G08B 29/04* (2006.01)
*G06F 1/30* (2006.01)

(52) U.S. Cl.
CPC ............. *G08B 29/046* (2013.01); *G06F 1/30* (2013.01)

(58) Field of Classification Search
CPC .... G08B 29/046; G08B 29/181; G08B 29/04; G06F 1/30; G01R 22/066
See application file for complete search history.

(56) References Cited

U.S. PATENT DOCUMENTS 6,816,069 B2 11/2004 Quigley
7,205,883 B2 * 4/2007 Bailey ........................ H04L 9/40 235/382
8,493,202 B1 * 7/2013 Trundle ................. G08B 29/02 340/502
8,907,807 B2 12/2014 Huang et al.
9,250,267 B1 * 2/2016 Jackson ................... G08B 7/06
9,613,507 B2 * 4/2017 Wilson ................... G08B 25/08
10,018,981 B2 * 7/2018 Nye ..................... G05B 19/048
10,939,041 B1 * 3/2021 Bart ........................ G08B 29/12
11,540,354 B2 * 12/2022 Saldin ..................... H02J 7/865
12,299,186 B1 * 5/2025 George ................... G06F 21/44
2001/0010032 A1 * 7/2001 Ehlers .................. G05B 19/042 702/62
2009/0146641 A1 * 6/2009 Sanderford, Jr. .... G01R 22/066 324/110
2013/0321150 A1 * 12/2013 Koenig ................ G08B 29/046 340/541
2015/0097958 A1 4/2015 Fadell et al.
2017/0240137 A1 * 8/2017 Morgan .............. B60R 25/1012
2017/0265124 A1 * 9/2017 Seemann ............... G06N 5/022
2018/0232031 A1 * 8/2018 Swierk ..................... H04L 43/20
2019/0363574 A1 * 11/2019 Meynardi ........... H02J 13/1323
2019/0377015 A1 * 12/2019 Ben Yochanan ...... H04L 9/3271
2020/0074123 A1 * 3/2020 Meiler .................... G06F 21/71
2021/0100069 A1 * 4/2021 Saldin ..................... H04L 45/22
(Continued)

*Primary Examiner* — Adnan Aziz
(74) *Attorney, Agent, or Firm* — Ballard Spahr LLP

(57) ABSTRACT

Methods, systems, and apparatuses are described for detecting tampering to a security system. A device may determine whether the device lost power due to a power outage or a tampering attempt. The device may send, to another device on the premises, a request for an indication of the power source providing power to another device. The device may receive, from another device, a response indicating the power source providing power to another device. Based on the power source providing power to another device, the device may send a notification.

20 Claims, 7 Drawing Sheets

400

(56) References Cited

U.S. PATENT DOCUMENTS

| | | | | |
|---|---|---|---|---|
| 2021/0288521 | A1* | 9/2021 | Sloop | G01R 19/2513 |
| 2021/0351610 | A1* | 11/2021 | Kanarellis | H02J 9/068 |
| 2023/0300757 | A1* | 9/2023 | Furuichi | H04W 52/34 |
| | | | | 455/522 |

* cited by examiner

METHODS AND APPARATUSES FOR DETECTING TAMPERING IN SECURITY SYSTEM

BACKGROUND

Many security devices, such as sensors, repeaters, and control panels, are equipped with external tamper switches or physical buttons that detect when they are physically unplugged. These switches or buttons are designed to trigger an alarm if someone tries to tamper with or disconnect the devices. For example, when someone unplugs the alternating current (AC) power of a security device, the switches or buttons may trigger security alarms. However, these switches or buttons create many mechanical issues due to different tolerance and/or wall plate designs. Furthermore, these switches or buttons often fail standard testing when exposed to a hostile testing environment, such as a very acidic vapor chamber.

SUMMARY

It is to be understood that both the following general description and the following detailed description are exemplary and explanatory only and are not restrictive. Methods, systems, and apparatuses for detecting potential tampering of a security system are described. For example, when a security device (e.g., a repeater, a sensor, a control panel, or the like) loses its power, the security device may query the power source providing power to another device on the premises to determine whether the power loss is due to a power outage or an attempt to tamper with the security device. The security device may receive a response indicating that the power source providing power to another device is primary power (e.g., AC power) or secondary power (e.g., battery power). Based on the power source providing power to another device, the security device may determine whether the power source of the security device has been compromised.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, show examples and together with the description, serve to explain the principles of the methods and systems.

DETAILED DESCRIPTION

Figure 1:
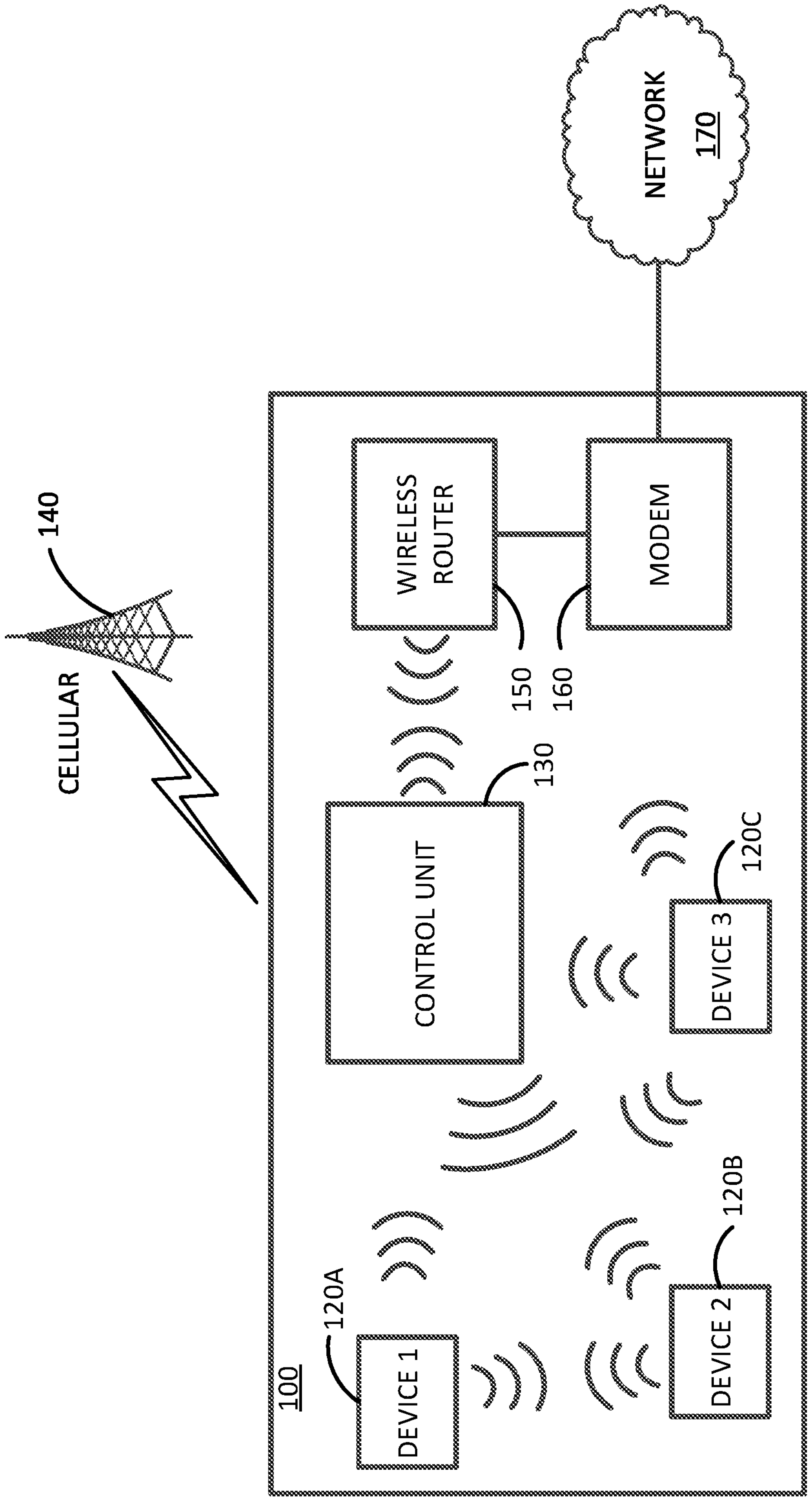
FIG. 1 shows a block diagram of an example operating environment.

As used in the specification and the appended claims, the singular forms "a," "an," and "the" include plural references unless the context clearly dictates otherwise.

"Optional" or "optionally" means that the subsequently described event or circumstance may or may not occur, and that the description includes cases where the event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

This detailed description may refer to a given entity performing some action. It should be understood that this language may in some cases mean that a system (e.g., a computer) owned and/or controlled by the given entity is actually performing the action.

Described herein are methods, systems, and apparatuses for detecting potential tampering within a security system. For example, a device (e.g., a repeater, a sensor, a control panel, or the like) in a security system/network may no longer receive power from a power source external to the device (e.g., AC power mains) due to a power/network outage in the area or a local event such as a tampering attempt by someone. When the power source providing power to the device changes from primary power (e.g., alternating current (AC) power) to secondary power (e.g., battery power), the device may survey or query other similarly situated devices to determine whether the power supply of one or more of the other similarly situated devices has been interrupted by the power outage or the tampering attempt. For example, the device may send a first query to another device on the premises requesting an indication of the power source providing power to another device. Based on the response from another device indicating that the current power source for another device is primary power (e.g., AC power), the device may determine that the power source of the device has been tampered with. Based on the response indicating that the current power source of another device is secondary power (e.g., battery power), the device may determine that the power source of the device has not been tampered with. The device may then send a notification indicating whether the power source of the device is tampered with or not.

Safety standards for a security system require that the security system provide a notification when the primary AC power of a security device (e.g., a sensor, a control panel, a repeater, or the like) is no longer providing power to the security device. For example, the primary AC power may no longer be providing power to the security device when the security device is unplugged from an electrical wall socket or otherwise disconnected from the primary AC power (e.g., a cut power line) or when there is a power outage in the area where the security system is located. Since the security system typically comprises multiple devices in the same location, the difference between a power outage and a tampering event (e.g., the device being unplugged from the electrical wall socket or otherwise disconnected from the primary AC power) may be determined based on the communication between the security device and the other devices in the security system.

For example, a security panel and a repeater in a security system may have integrated batteries for secondary power (or backup power). When the security panel and the repeater are no longer receiving power from the primary power source (e.g., AC power), these devices may still operate by receiving power from the secondary power source (e.g., battery power). The power source currently providing power to these security devices (e.g., the security panel and the repeater) may be compared to determine whether the security devices no longer receiving power from the primary power source is due to a power outage or a tampering attempt. For example, if the power source currently providing power to the security panel is primary power (e.g., AC power) and the power source currently providing power to the repeater is secondary power (e.g., battery power), it can be determined that the repeater was unplugged from or otherwise disconnected from the primary power source (e.g., the AC power mains) and therefore a tampering attempt has occurred. In another example, the security system may include the repeater and a router that has an external battery (or backup power). The repeater may be used with the router to determine whether the power loss of the repeater is due to a power outage or a tampering attempt. For example, if the power source currently providing power to the router is primary power (e.g., AC power) but the power source currently providing power to the repeater is secondary power (e.g., battery power), it can be determined that the repeater is unplugged or otherwise disconnected from primary power and is in a tampered state.

In another example, security devices (e.g., a sensor, a repeater, a control panel, or the like) in a security network may communicate with a user device (e.g., a mobile phone, a smartphone, or the like). The user device may use its geo-location and back-end communications with various servers to determine the status of primary power (e.g., AC power) in the location where the user device and the security network are located. When a security device (e.g., a sensor, a repeater, a control panel, or the like) is no longer receiving power from its primary power (e.g., AC power) source, the security device may communicate with the user device (e.g., a mobile phone, a smartphone, or the like) for the power status of the location (e.g., is the primary power source providing power within the location). The user device may provide the current power status of the location based on its geo-location and back-end communications with various servers. If the primary power (e.g., AC power) source is providing power within the location, the security device may determine that a tampering event has occurred to the security device. If the primary power source is not providing power within the location and/or the source of power within the location is not primary power (e.g., a power outage), the security device may determine that a tampering event has not occurred to the security device.

In another example, security devices (e.g., a sensor, a repeater, a control panel, or the like) in a security network may communicate with a router that is not configured with, and thus not able to receive power from, secondary power (e.g., battery power) but is only able to receive power from primary power. When a security device (e.g., a sensor, a repeater, a control panel, or the like) is no longer receiving its source of power from primary power (e.g., AC power), the security device may send a query to the router about the power source providing power to the router or any request that cause a response from the router. If the security device receives any response from the router within a predetermined amount of time, the security device may determine that the router is receiving power from the primary power, there is no power outage such that primary power is not providing power to the area, and a tampering event has occurred to the security device. If the security device does not receive any response from the router within the predetermined amount of time, the security device may determine that the router is not receiving power from the primary power, there is power outage associated with the primary power, and a tampering event has not occurred to the security device. The predetermined amount of time may be anywhere between 1 millisecond to 1 day.

The term primary power may refer to electrical energy provided by one or more power sources external to one or more devices. For example, the primary power may be provided by power sources physically external to or outside of the device. For example, the primary power may be provided based on a physical connection to a device. The one or more external sources may include, but are not limited to, an AC-DC power supply, an AC power source, a DC power source, a solar power panel, and other similar electrical energy sources. For example, devices may receive power from primary power when they are plugged into an electrical socket associated with or otherwise electrically coupled to the AC-DC power source, the AC power source, the DC power, the solar panel, and/or other similar electrical power sources. The AC power source may be a 120V AC outlet or a 220V AC outlet on a residential or business premises. The DC power source may be a 5V DC USB outlet on a residential or business premises.

The term secondary power may refer to electrical energy provided by one or more power sources internal to one or more devices. For example, the secondary power may be provided by power sources physically internal to or inside of the device. The one or more internal sources may include, but are not limited to, a lithium metal battery, a lithium-ion battery, a lithium-polymer battery, an alkaline battery, a nickel-metal hydride battery, an integrated photovoltaic (solar), and other similar electrical energy sources. For example, devices may receive power from the secondary power when they receive electrical energy from the lithium metal battery, the lithium-ion battery, the lithium-polymer battery, the alkaline battery, the nickel-metal hydride battery, the integrated photovoltaic (solar), and/or other similar electrical energy sources.

FIG. 1 shows a block diagram of an example security system 100 that may be used to detect tampering to the security system. As shown in FIG. 1, the security system 100 may comprise one or more security devices (e.g., device 1 120*a*, device 2 120*b*, and device 3 120*c*), a control unit 130 (or a control panel), a wireless router 150, and a modem 160. The security devices (e.g., device 1 120*a*, device 2 120*b*, and/or device 3 120*c*) may comprise sensors such as a smoke detector, a carbon monoxide detector, a flood and water leak sensor, a heat sensor, and/or an environmental sensor. The security devices (e.g., device 1 120*a*, device 2 120*b*, and/or device 3 120*c*) may comprise monitoring devices such as a door/window sensor, an entry point sensor, a motion sensor, a glass break sensor, a security camera and/or a surveillance camera. The security devices (e.g., device 1 120*a*, device 2 120*b*, and/or device 3 120*c*) may comprise network devices such as a repeater, a gateway, a router, an access point, and/or a control panel. The security devices (e.g., device 1 120*a*, device 2 120*b*, and/or device 3 120*c*) may further comprise electronic devices such as a smart lock, an alarm, a speaker, a dial-out line, and/or a message notification display.

The security devices (e.g., device 1 120*a*, device 2 120*b*, and/or device 3 120*c*) may be located at an entry point barrier and in communication with a control unit 130 and/or a wireless router 150. The control unit 130 may be used to configure and control the security devices (e.g., device 1 120*a*, device 2 120*b*, and/or device 3 120*c*), either directly (e.g., wired or wireless) or by providing a gateway to a network 170 via a communication element (e.g., network card, cellular transceiver, etc.) in communication with the wireless router 150. The control unit 130 may be configured to disable/deactivate security alarms, alerts, and/or notifications that are triggered/activated by the security devices (e.g., device 1 120*a*, device 2 120*b*, and/or device 3 120*c*). The control unit 130 may disable/deactivate the security system 100 in response to receiving a disable command, such as a code, token, biometric, etc., associated with an authorized user of the control unit 130.

The security devices (e.g., device 1 120*a*, device 2 120*b*, and/or device 3 120*c*), the control unit 130, the wireless router 150, and the modem 160 may receive electrical power from a primary power source such as AC power and a secondary power (or backup power) source such as one or more batteries. The security devices (e.g., device 1 120*a*, device 2 120*b*, and/or device 3 120*c*), the control unit 130, the wireless router 150, and the modem 160 may be configured to operate based on power received from either the primary power source or the secondary power source. For example, the control unit 130 may be connected to the main AC to operate under primary power and have a battery to operate under secondary power when the primary power is not available. Device 3 120*c* (e.g., a repeater) may be connected to the main AC to operate under primary power and have a battery to operate under secondary power when the primary power is not available. The security devices in the security system 100, for example, the control unit 130 and device 3 120*c*, may stop receiving power from the primary power source due to a power/network outage or a local event such as unplugging the one or more security devices from an electrical socket or otherwise disconnecting the one or more security devices from the primary power source, or a tampering attempt. When the device 3 120*c* detects that its source of power changes from primary power (e.g., AC power) to secondary power (e.g., battery power), the device 3 120*c* may send a query to the control unit 130 or any other devices in the security system 100 to determine whether the power supplied by the primary power source to the device 3 120*c* has been interrupted by the power outage or the local event, such as a tampering attempt. The query sent to the control unit 130 may include a request for the identification of the current source of power (e.g., primary power or secondary power) for the control unit 130.

Upon receiving the query from the device 3 120*c*, the control unit 130 may determine the power source providing power to the control unit 130. If the control unit 130 operates based on power received from an AC power source, the control unit 130 determines that the power source for the control unit 130 is primary power. If the control unit 130 operates based on power received from a battery, the control unit 130 determines that the power status of the control unit 130 is secondary power. The control unit 130 may then send a response indicating the power source of the control unit 130 to the device 3 120*c*. Upon receiving the response from the control unit 130, the device 3 120*c* may determine, based on the power source providing power to the control unit 130, whether the power source of the device 3 120*c* has been tampered with/compromised. For example, if the power source for the control unit 130 indicates the control unit 130 is in primary power, the device 3 120*c* may determine that the power source of the device 3 120*c* is tampered with/compromised. If the power source for the control unit 130 indicates the control unit 130 is in secondary power, the device 3 120*c* may determine that the power source of the device 3 120*c* is not tampered with/compromised (e.g., a power outage has occurred). The device 3 120*c* may then send a notification indicating whether the power source of the device 3 120*c* is tampered with/compromised.

Alternatively or additionally, if the device 3 120*c* determines, based on the power source providing power to the control unit 130 (e.g., secondary power), that the power source of the device 3 120*c* is not compromised, the device 3 120*c* may send another query to another security device (e.g., device 2 120*b*) or any other devices in the security system 100 to confirm the determination. For example, device 2 120*b* may receive the query from the device 3 120*c* and determine the power source providing power to the device 2 120*b*. Similar to the control unit 130, if the device 2 120*b* operates based on power received from an AC power source, the device 2 120*b* determines that the power source for the device 2 120*b* is primary power. If the device 2 120*b* operates based on power received from a battery, the device 2 120*b* determines that the power source for the device 2 120*b* is secondary power. The device 2 120*b* may then send a response indicating the power source providing power to the device 2 120*b* to the device 3 120*c*. The device 3 120*c* may receive the response from the device 2 120*b* and determine, based on the power source of the device 2 120*b*, whether the power source of the device 3 120*c* has been tampered with or compromised. For example, if the power source for the device 2 120*b* indicates the device 2 120*b* is in primary power, the device 3 120*c* may determine that the power source of the device 3 120*c* is tampered with or compromised. If the power source for the device 2 120*b* indicates the device 2 120*b* is in secondary power, the device 3 120*c* may confirm that the power source of the device 3 120*c* is not tampered with or compromised (e.g., a power outage has been occurred). The device 3 120*c* may then send a notification indicating whether the power source of the device 3 120*c* is compromised.

Communication between the control unit 130 and the security devices (e.g., device 1 120*a*, device 2 120*b*, and/or device 3 120*c*) may be provided by coupling the control unit 130 with the wireless router 150, which in turn may be in communication with the network 170, such as a provider network or the Internet, via the modem 160. It is to be understood that the wireless router 150 and the modem 160 may be separate devices or they may be a single device. The wireless router 150 may be in communication with the network 170 through cable broadband, DSL, and the like. The network 170 may be in communication with a control server via an appropriate series of routers and firewalls (not shown). The control unit 130 may have additional mechanisms to provide communication with the control server, such as a cellular network transceiver that permits communication with a cellular network 140. The cellular network 140 may provide access via routers and firewalls to the control server. Additionally, the control unit 130 may provide gateway functionality via cellular and dwelling-based routers and modems, such as WiMAX, satellite-based broadband, direct telephone coupling, and the like.

In order to communicate with the security devices (e.g., device 1 120*a*, device 2 120*b*, and/or device 3 120*c*) that are part of the security system 100, the control unit 130 may be in communication with one or more transceiver modules. The one or more transceiver modules may permit communication with the security devices (e.g., device 1 120*a*, device 2 120*b*, and/or device 3 120*c*) using a variety of protocols in a configurable manner, such as ZigBee, Z-Wave, Bluetooth™, WiFi, RFID, and the like. Other protocols may be provided for via one or more plug-in modules such as digital enhanced cordless telecommunication devices (DECT) and the like. In this way, the control unit 130 may be configured to provide for control of the security devices (e.g., device 1 120*a*, device 2 120*b*, and/or device 3 120*c*) using protocols known today and in the future. The security devices (e.g., device 1 120*a*, device 2 120*b*, and/or device 3 120*c*) may include one or more transceiver modules to communicate with other security devices, the control unit 130, the wireless router 150, and the modem 160. The security devices (e.g., device 1 120*a*, device 2 120*b*, and/or device 3 120*c*) may communicate each other or with the control unit 130, the wireless router 150, and/or the modem 160, using a variety of protocols in a configurable manner, such as ZigBee, Z-Wave, Bluetooth™, WiFi, RFID, and the like.

It is noted that the security system 100 (or security network) may be a home security system/network, a business security system/network, a private security system/network, a public security system/network, or the like. The security system 100 may comprise a plurality of security devices. Examples of the plurality of security devices may include, but are not limited to, a control panel, a router, a repeater, a gateway, an access point, a door/window sensor, a motion sensor, a glass break sensor, a smoke and carbon monoxide detector, a flood and water leak sensor, a heat sensor, an environment sensor, a security camera, a smart lock, and an alarm. One or more of the plurality of security devices may be equipped with a backup battery. One or more of the plurality of security devices may be configured to operate under battery power or AC power.

Figure 2:
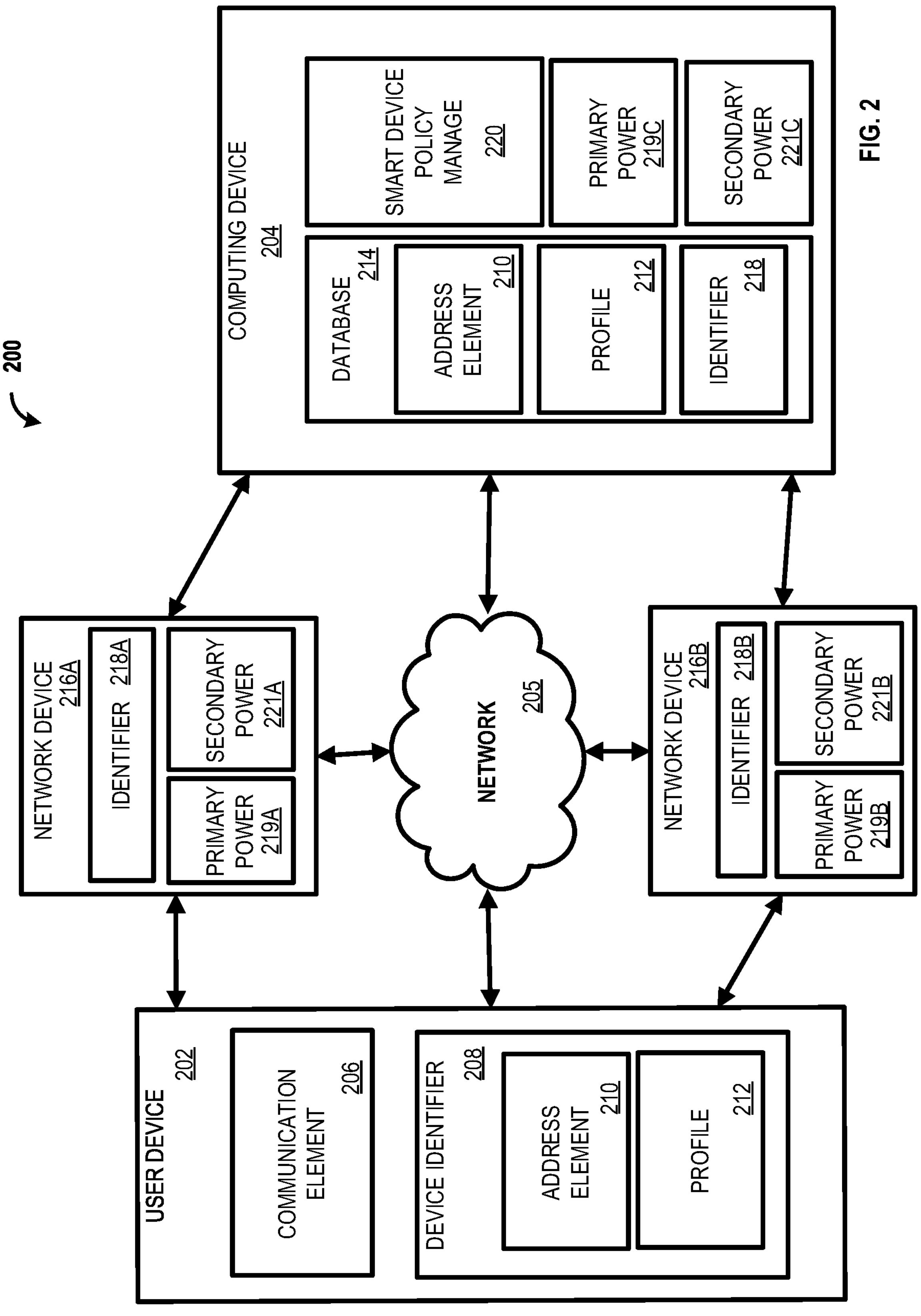
FIG. 2 shows a block diagram of an example system.

The above description of the security system 100, as well as the description of the security system 200 in FIG. 2, is only one of many possible configurations. As noted above, the wireless router 150 and the modem 160 may be a single device or separate devices. Further, the control unit 130 may be a single device or it may be a system of several devices (e.g., a programmable logic unit in communication with a human/machine interface, etc.). Additional configurations of the security system 100, while not explicitly described herein, may be operable with the present security system sensors and methods, as may be appreciated by one skilled in the art.

FIG. 2 shows a block diagram of a security system 200 that may be used to detect tampering in a security system. The security system 200 may comprise a user device 202, device 1 216*a*, device 2 216*b*, a computing device 204 (e.g., a control unit, a control panel, or the like), and a network 205. The computing device 204 may be disposed locally or remotely relative to the user device 202, device 1 216*a*, and/or device 2 216*b*. As an example, the user device 202, the device 1 216*a*, the device 2 216*b*, and/or the computing device 204 may be in communication via a private and/or public network 205 such as the Internet or a local area network (e.g., Wireless Local Area Network). Other forms of communication may be used such as wired and/or wireless telecommunication channels, for example.

The device 1 216*a* and/or device 2 216*b* may be security devices such as sensors, monitoring devices, network devices, and/or the like. For example, the device 1 216*a* and/or device 2 216*bb* may comprise sensors such as a smoke and carbon monoxide detector, a flood and water leak sensor, a heat sensor, and/or an environment sensor. The device 1 216*a* and/or device 2 216*b* may comprise monitoring devices such as a door/window sensor, an entry point sensor, a motion sensor, a glass break sensor, a security camera and/or a surveillance camera. The device 1 216*a* and/or device 2 216*b* may comprise network devices such as a repeater, a gateway, a router, an access point, and/or a control panel. The device 1 216*a* and/or device 2 216*b* may further comprise electronic devices such as a smart lock, an alarm, a speaker, a dial-out line, and/or a message notification display.

The user device 202 may be an electronic device such as a computer, a smartphone, a laptop, a tablet, a set-top box, a display device, a presentation device, a media device, or other device capable of communicating with the device 1

216*a*, the device 2 216*b*, and/or the computing device 204 directly (e.g., device-to-device communication) or indirectly (e.g., via the network 205). The user device 202 may have a communication element 206 for providing an interface to a user to interact with the user device 202, the device 1 216*a*, and/or the device 2 216*b*. The communication element 206 may be any interface for presenting and/or receiving information to/from the user, such as user feedback. An example interface may be a communication interface such as a web browser (e.g., Internet Explorer, Mozilla Firefox, Google Chrome, Safari, or the like) or a locally executing application (e.g., installed on a memory of the user device 202). Other software, hardware, and/or interfaces may be used to provide communication between a user and one or more of the user device 202, the device 1 216*a*, the device 2 216*b* and the computing device 204. As an example, the communication element 206 may request or query various files from a local source and/or a remote source (e.g., a control server in communication with the computing device 204 via the network 205). As a further example, the communication element 206 may transmit data to a local or remote device such as the computing device 204 (e.g., queries and/or customizations relating to one or more security system policies).

A device identifier 208 of the user device 202 may have an address element 210 and a service element 212. The address element 210 may have or provide an Internet protocol address, a network address, a media access control (MAC) address, an Internet address, or the like. As an example, the address element 210 may be relied upon to establish a communication session between the user device 202 and the computing device 204 or other devices and/or networks (e.g., the device 1 216*a*, the device 2 216*b*, network 205, a control server, etc.). As a further example, the address element 210 may be used as an identifier or locator of the user device 202.

The service element 212 may be an identification of a service provider and/or manufacturer associated with the user device 202 and/or with the class of user device 202. The class of the user device 202 may be related to a type of device, capability of device, type of service being provided, and/or a level of service (e.g., business class, service tier, service package, etc.). As an example, the service element 212 may identify information relating to or provided by a communication service provider (e.g., Internet service provider) that is providing or enabling data flow such as communication services to the user device 202. The address element 210 may be used to identify or retrieve data from the service element 212, or vice versa. As a further example, one or more of the address element 210 and the service element 212 may be stored remotely from the user device 202 and retrieved by one or more devices such as the user device 202 and the computing device 204. Other information may be represented by the service element 212 as well.

The computing device 204 may be an electronic device (e.g., programmable logic unit with a human/machine interface, a computer, a tablet, etc.) for communicating with the user device 202, the device 1 216*a*, and/or the device 2 216*b*. The computing device 204 may be a control panel or a control unit in the security system 200. As an example, the computing device 204 may communicate with the device 1 216*a*, the device 2 216*b*, and the user device 202 when implementing security system policies. The computing device 204 may provide services such as network (e.g., Internet) connectivity, sensor management, device management, network printing, media management (e.g., media server), content services, streaming services, broadband services, or other network-related or security-related services to the device 1 216*a*, and the device 2 216*b*, as well as other security devices that are part of the security system (e.g., cameras, alarms, speakers, etc.). The computing device 204 may allow the user device 202 to interact with remote resources such as data, devices, and files (e.g., security system parameters).

The computing device 204 may manage communication between the user device 202 and a database 214 for sending and receiving data therebetween. The database 214 may store a plurality of files (e.g., security system policies/data), logs, records, or other information. The user device 202 may request and/or retrieve a file from the database 214. The database 214 may store information relating to the user device 202 such as the address element 210 and/or the service element 212. The computing device 204 may obtain the user device identifier 208 from the user device 202 and retrieve information from the database 214 such as the address element 210 and/or the service elements 212. The computing device 204 may obtain the address element 210 from the user device 202 and may retrieve the service element 212 from the database 214, or vice versa. Any information may be stored in and retrieved from the database 214. The database 214 may be disposed remotely from the computing device 204 and accessed via direct or indirect connection. The database 214 may be integrated with the computing device 204 or some other device or system.

One or more security system devices such as the device 1 216A, and/or the device 2 216B may be in communication with a network such as network 205 and/or in communication directly with the computing device 204. The device 1 216A, and/or the device 2 216B may be configured to connect to a wired and/or wireless network using Wi-Fi, Bluetooth, BLE, NFC, IrDA, ANT, ZigBee, Z-Wave, ultrasound, or any desired method or standard.

The device 1 216A, and/or the device 2 216B may each have an identifier 218. As an example, one or more identifiers 218 may be or relate to an Internet Protocol (IP) Address IPV4/IPV6 or a media access control address (MAC address) or the like. As a further example, one or more identifiers 218 may be a unique identifier for facilitating communications on a physical network segment (e.g., between security devices (e.g., the device 1 216A and/or the device 2 216B) and the user device 202 or the network 205). Each of the device 1 216*a*, and the device 2 216*b* may have a distinct identifier 218. As an example, the identifiers 218 may be associated with respective physical locations of the device 1 216A, and/or the device 2 216B.

The device 1 216A, the device 2 216B, and/or the computing device 204 may receive electrical power from one or more external sources providing primary power 219 such as AC power and one or more internal sources providing secondary power (or backup) power 221 such as one or more batteries. The device 1 216A, the device 2 216B, and/or the control unit 130 may operate based on either the primary power 219 or the secondary power 221. The primary power 219A-C may refer to electrical energy provided by one or more external sources as to the device 1 216A, the device 2 216B, and/or the computing device 204. For example, the primary power 219A-C may be provided based on one or more physical connections to the device 1 216A, the device 2 216B, and/or the computing device 204. The one or more external sources for the primary power 219A-C may comprise an AC-DC power supply, an AC power source (e.g., 120V AC outlet), a DC power source (e.g., 5V DC USB outlet), a solar power panel, and other similar electrical energy sources. The secondary power 221A-C may refer to electrical energy provided by one or more internal sources as to the device 1 216A, the device 2 216B, and/or the computing device 204. For example, the secondary power 221A-C may be provided based on the sources physically internal to or inside of the device 1 216A, the device 2 216B, and/or the computing device 204. The one or more internal sources of the secondary power 221A-C may comprise a lithium metal battery, a lithium-ion battery, a lithium-polymer battery, an alkaline battery, a nickel-metal hydride battery, an integrated photovoltaic (solar), and other similar electrical energy sources.

For example, the device 1 216A may be a repeater that can receive electrical power from one or more power sources providing primary power 219A and one or more power sources providing secondary power 221A. The device 1 216A may operate based on either the primary power 219A or the secondary power 221A. The device 2 216B may be a router that can receive electrical power from one or more power sources providing primary power 219B and one or more power sources providing secondary power 221B. The device 2 216B may operate based on either the primary power 219B or the secondary power 2221B. The device 1 216A and the device 2 216B may stop receiving power from the power sources providing the primary power 219A-B due to a power/network outage or a local event such as an unplugging the device 1 216A and the device 2 216B from electrical sockets or otherwise disconnecting the device 1 216A and the device 2 216B from the power sources providing the primary power 219A-B or a tampering attempt. When the device 1 216A detects that its power source providing power to the device 1 216A changes from the power source providing the primary power 219A to the power source providing the secondary power 221A, the device 1 216A may send a query to the device 2 216B to determine whether the primary power 219A supplied to the device 1 216A has been interrupted by the power outage or the local event, such as a tampering attempt. The query sent to the device 2 216B may include a request for the identification of the current source of power (e.g., primary power 219B or secondary power 221B) for the device 2 216B.

When the device 2 216B receives the query from the device 1 216A, the device 2 216B may determine the power source providing power to the device 2 216B. If the device 2 216B operates based on power received from an AC power source, the device 2 216B determines that the power source for the device 2 216B is primary power 219B. If the device 2 216B operates based on power received from a battery, the device 2 216B determines that the power source for the device 2 216B is secondary power 221A. The device 2 216B may then send a response indicating the power source of the device 2 216B to the device 1 216A. When the device 1 216A receives the response from the device 2 216*b*, the device 1 216A may determine, based on the power source of the device 2 216B, whether the power source of the device 1 216A has been tampered with or compromised. For example, if the power source of the device 2 216B indicates the device 2 216B is in primary power (e.g., AC power) 219B, the device 1 216A may determine that the power source of the device 1 216A is tampered with or compromised. If the power source of the device 2 216B indicates the device 2 216*b* is in secondary power (e.g., battery power) 221B, the device 1 216B may determine that the power source of the device 1 216A is not tampered with or compromised (e.g., a power outage). The device 1 216A may send a notification indicating whether the power source of the device 1 216A is tampered with or compromised.

The device 1 216A may be in communication with the device 2 216B. The device 1 216A and/or the device 2 216B may be in communication with the computing device 204. The device 1 216A and/or the device 2 216B may be in communication with the network 205. The device 1 216A and/or the device 2 216B may have a low energy transmission device, such as a Bluetooth® Low Energy (BLE) device. BLE is a protocol that allows for long-term operation of Bluetooth® devices in low-volume data transmission. BLE may enable smaller form factors, better power optimization, and power cells that last for years on a single charge. BLE may function by transmitting brief bursts of low-bitrate data. BLE devices may operate for significantly longer periods of time with the same total power usage by drastically reducing the time spent at peak power consumption. Communication between the device 1 216A, the device 2 216B and the computing device 204 described herein may be accomplished using the BLE protocol. The device 1 216A and/or the device 2 216B may be configured with other low energy protocols such as near field communication (NFC), infrared data association (IrDA), ANT, ZigBee, Z-wave, ultrasound, and the like. A low energy device may be characterized as using less than about 200 microwatts per bit of data transmission, having a maximum current draw of less than about 50 milliamps, and/or less than about 0.2 milliwatts of power usage. Other low energy devices are specifically contemplated.

The device 1 216A and/or the device 2 216B may be configured as a peripheral device. For example, the device 1 216A and/or the device 2 216B may be configured as a beacon where the device 1 216A and/or the device 2 216B transmits packets that include an identifier 218 (e.g., a device identifier) and a status of an associated security function. The device 1 216A and/or the device 2 216B may be configured as a BLE and/or a ZigBee beacon. The device 1 216A and/or the device 2 216B may broadcast the identifier 218 which may be a universal unique identifier (UUID). The computing device 204 may be configured as a central device that monitors for one or more device identifiers 218A, 218B. If the identifier 218 is an identifier for which the computing device 204 monitors and the computing device 204 detects the identifier 218, then the computing device 204 may perform an action based on the identifier 218 the computing device 204 detected (e.g., trigger one or more security system alert) and the indication(s) received. The computing device 204 may be monitoring for the identifier 218 based on an application installed on the computing device 204. As an example, the action may be to establish a communication session between the device 1 216A and/or the device 2 216B and the computing device 204 (e.g., when initially connecting device 1 216A and/or the device 2 216B to the security system 200). As another example, the action may be performed at the computing device 204 such as triggering a security system alert and/or performing a function (e.g., causing an alarm to be triggered, contacting law enforcement, etc.).

Figure 3:
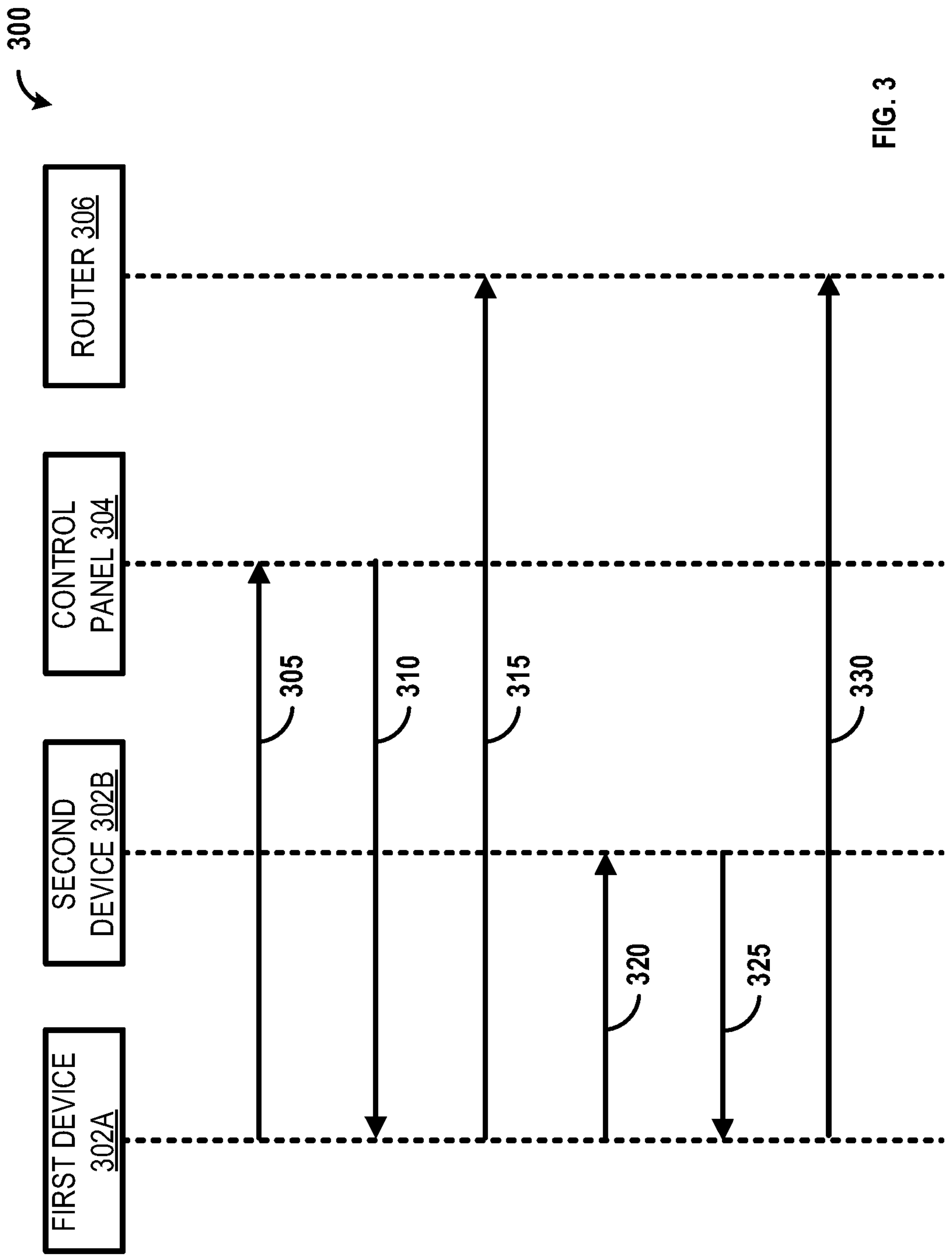
FIG. 3 shows an example communications flow in the example system.

FIG. 3 shows an example communications flow 300 for detecting tampering within a security system/network. The security system/network may be a home security system/network, a business security system/network, a private security system/network, a public security system/network, or the like. The security system/network may comprise a first device 302A, a second device 302B, a control panel 304, and a router 306. Although it is not illustrated in FIG. 3, the security system/network may further comprise other security devices such as a repeater, a gateway, an access point, a door/window sensor, a motion sensor, a glass break sensor, a smoke detector, a carbon monoxide detector, a flood and water leak sensor, a heat sensor, an environmental sensor, a security camera, a smart lock, or an alarm. The first device 302A, the second device 302B, and/or the control panel 304 may be equipped with a backup battery, which acts as a secondary power source for the particular device. The first device 302A, the second device 302B, and/or the control panel 304 may be configured to operate under primary power from a primary power source or secondary power from a secondary power source. The router 306 may not be equipped with a secondary power source (e.g., battery) and operates only under primary power from the primary power source. The router 306 may optionally have a secondary power source (e.g., battery power) and may operate under secondary power from the secondary power source. In case the router 306 has the secondary power source, the router 306 may be configured operate under primary power from the primary power source or secondary power from the secondary power source. The first device 302A, the second device 302B, the control panel 304, and/or the router 306 may lose or stop receiving power from the primary power source due to a power/network outage or a local event, such as a tampering attempt. The first device 302A, the second device 302B, the control panel 304, and/or the router 306 may determine whether a change from receiving primary power from the primary power source to receiving secondary power from the respective secondary power source of the device is due to the power/network outage or the local event, such as a tampering attempt.

Primary power may refer to electrical energy provided by one or more primary power sources external to the first device 302A, the second device 302B, the control panel 304, and the router 306. For example, the primary power may be provided by the primary power source based on a physical connection (e.g., a plug and electrical socket or wired connection) to the first device 302A, the second device 302B, the control panel 304, and/or the router 306. The primary power source may comprise an AC-DC power supply, an AC power source (e.g., 120V AC outlet or 220V AC outlet), a DC power source (e.g., 5V DC USB outlet), a solar power panel, or other similar electrical energy sources. Secondary power may refer to electrical energy provided by one or more secondary power sources that are located internal to or inside of each of the first device 302A, the second device 302B, the control panel 304, and/or the router 306. The one or more internal secondary power sources may comprise a lithium metal battery, a lithium-ion battery, a lithium-polymer battery, an alkaline battery, a nickel-metal hydride battery, an integrated photovoltaic (solar), or other similar electrical energy sources.

The first device 302A, the second device 302B, the control panel 304, and/or the router 306 may receive primary power from the primary power source by connecting to standard power outlets providing AC power or by being directly wired to a source of AC power. Alternatively or additionally, the first device 302A, the second device 302B, the control panel 304, and/or the router 306 may receive primary power by connecting to non-standard power outlets providing DC power. Examples of non-standard power outlets providing DC power may include, but are not limited to, USB outlets (or USB port outlets), DC microgrids, and direct DC power distribution. For example, USB outlets may provide low-voltage DC power to the devices such as smartphones, tablets, and sensors. The USB outlets may be powered by AC-to-DC converters in the outlet. In case the first device 302A, the second device 302B, the control panel 304, and/or the router 306 are powered by the non-standard power outlets (e.g., USB outlets) providing DC power, the power source providing power to the first device 302A, the second device 302B, the control panel 304, and/or the router 306 may be referred to as a primary power source.

At 305, a first query may be sent. For example, the first device 302A may send the first query to the control panel 304. For example, the first device 302A may send the first query to the control panel 304 based on a change in the power source providing power to the first device 302A. The power source providing power to the first device 302A may change from the primary power source providing primary power to the secondary power source providing secondary power. The first query may comprise/indicate a request for an indication of the power source providing power to the control panel 304. The control panel 304 may determine the power source providing power to the control panel 304 based on the control panel 304 receiving the first query.

At 310, a first response may be received. For example, the first device 302A may receive, from the control panel 304, the first response. For example, the control panel 304 may send the first response to the first device 302A. The first response may comprise/indicate the power source providing power to the control panel 304. For example, the first response may indicate the power source providing power to the control panel 304 is the primary power source (e.g., AC power) or the secondary power source (e.g., battery power). Based on the response indicating the power source providing power to the control panel 304 is the primary power source, the first device 302A may determine that the power source of the first device 302A has been tampered with or compromised because the control panel 304 is still receiving power from the primary power source (e.g., the main AC power). The main AC power may refer to mains electricity or utility power supplied by the electrical grid to homes, businesses, and other facilities for various uses.

Based on the first device 302A determining that the primary power source of the first device 302A or the first device 302A itself has been tampered with or compromised, at 315, a notification may be sent. For example, the first device 302A may send the notification indicating that the primary power source of the first device 302A or the first device 302A itself has been tampered with or compromised. The first device 302A may send the notification to the router 306 and/or a computing device (e.g., a user device or a server) outside of the security system/network (not shown).

Based on the response indicating the power source providing power to the control panel 304 is the secondary power source, the first device 302A may determine that the primary power source of the first device 302A or the first device 302A itself has not been tampered with or compromised because both the first device 302A and the control panel 304 have stopped receiving power from the primary power source (e.g., the main AC power), which indicates the loss of power from the primary power source is due to a power outage associated with the primary power source.

The first device 302A may send another query to other adjacent security devices to confirm that determination. At 320, a second query may be sent. For example, the first device 302A may send the second query to the second device 302B to confirm the determination that the first device 302A and/or the primary power source is not tampered with or compromised. The second query may comprise/indicate a request for an indication of the power source providing power to the second device 302B. The second device 302B may receive the second query from the first device 302A. The second device 302B may determine the power source currently providing power to the second device 302B based on receiving the second query.

At 325, a second response may be received. For example, the second device 302B may send the second response to the first device 302A. For example, the first device 302A may receive, from the second device 302B, the second response indicating the power source currently providing power to the second device 302B. The second response may indicate the power source currently providing power to the second device 302B is the primary power source (e.g., AC power) or the secondary power source (e.g., battery power).

Based on the response indicating the power source providing power to the second device 302B is the secondary power source, the first device 302A may confirm or determine that the first device 302A and/or the primary power source is not tampered with or compromised because the adjacent devices, both the control panel 304 and the second device 302B, also stopped receiving power from the primary power source (e.g., the main AC power). Based on the first device 302A confirming or determining that the primary power source of the first device 302A or the first device 302A itself is not tampered with or compromised, at 330, a notification may be sent. For example, the first device 302A may send the notification indicating that the primary power source of the first device 302A or the first device 302A itself is not tampered with or compromised. The first device 302A may send the notification to the router 306 and/or a computing device (e.g., a user device or a server) outside of the security system/network (not shown).

Based on the response indicating that the power source providing power to the second device 302B is the primary power source, the first device 302A may determine that the first device 302A or the primary power source is tampered with or compromised since at least one device, the second device 302B, in the security system/network is still receiving power from the primary power source (e.g., the main AC power). Based on the first device 302A determining that the primary power source of the first device 302A or the first device 302A itself is tampered with or compromised, at 330, a notification may be sent. For example, the first device 302A may send the notification indicating that the power source of the first device 302A or the first device 302A itself is tampered with or compromised. The first device 302A may send the notification to the router 306 and/or a computing device (e.g., a user device or a server) outside of the security system/network (not shown).

Based on the response indicating that the power source providing power to the second device 302B is the secondary power source, the first device 302A may determine that the first device 302A or the primary power source have not been tampered with or compromised since multiple devices, the control panel 304 and the second device 302B, in the security system/network are no longer receiving power from the primary power source (e.g., the main AC power). Based on the first device 302A determining that the primary power source of the first device 302A or the first device 302A itself has not been tampered with or compromised, at 330, a notification may be sent. For example, the first device 302A may send the notification indicating that the primary power source of the first device 302A or the first device 302A itself has not been tampered with or compromised. The first device 302A may send the notification to the router 306 and/or a computing device (e.g., a user device or a server) outside of the security system/network (not shown).

Figure 4:
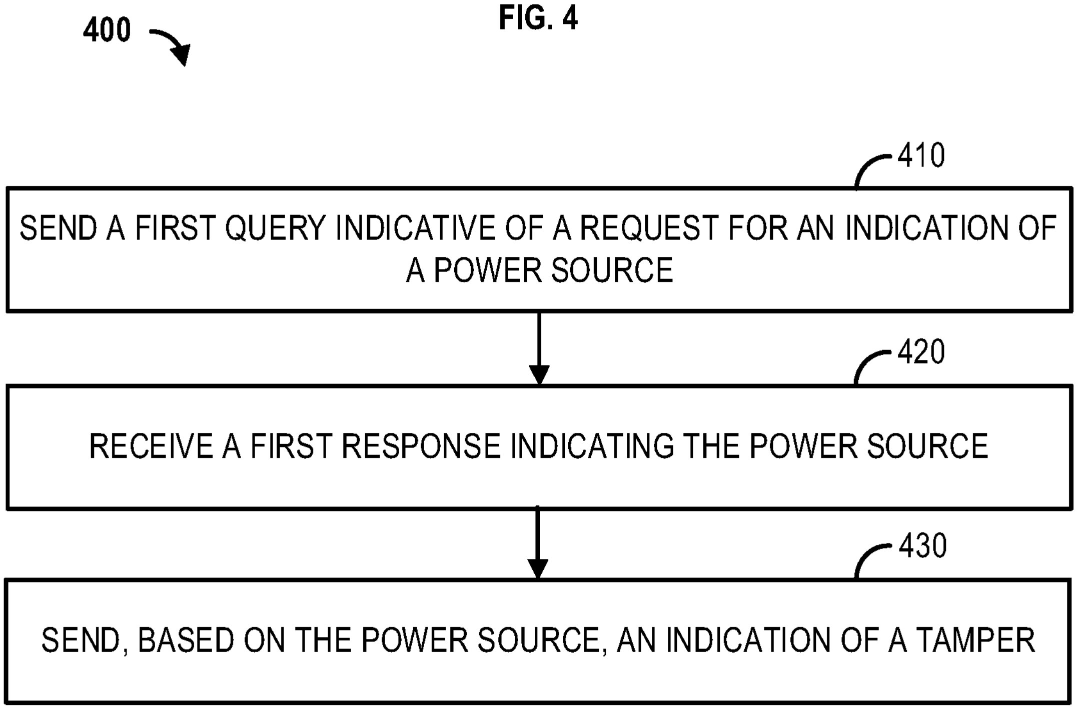
FIG. 4 shows a flowchart of an example method.

FIG. 4 shows an example flowchart 400 for detecting tampering within a security system/network. The security system/network may be a home security system/network, a business security system/network, a private security system/network, a public security system/network, or the like. The security system/network may comprise a plurality of security devices. Examples of the plurality of security devices may include, but are not limited to, a control panel, a router, a repeater, a gateway, an access point, a door/window sensor, a motion sensor, a glass break sensor, a smoke detector, a carbon monoxide detector, a flood and water leak sensor, a heat sensor, an environmental sensor, a security camera, a smart lock, and an alarm. One or more of the plurality of security devices may be configured to receive primary power from a primary power source and/or secondary power from a secondary power source (e.g., backup batteries). One or more of the plurality of security devices may be configured to operate based on one or more primary power sources providing primary power and/or one or more secondary power sources providing secondary power. One or more of the plurality of security devices may stop receiving the primary power from the primary power source (e.g., main AC power) due to a power/network outage or a local event such as a tampering attempt. One or more of the plurality of security devices may determine whether the particular device no longer receiving primary power from the primary power source is due to the power/network outage or the local event such as a tampering attempt (e.g., unplugging the one or more security devices from an electrical socket providing the primary power from the primary power source or otherwise disconnecting the one or more security devices from the primary power source).

As described above, the primary power source may refer to electrical power provided by one or more power sources external to each of the plurality of security devices. For example, the primary power may be provided by the primary power source based on physical connections (e.g., a plug and electrical socket or wired connection) to each of the plurality of security devices. The one or more primary power sources may comprise an AC-DC power supply, an AC power source (e.g., 120V AC outlet or 220V AC outlet), a DC power source (e.g., 5V DC USB outlet), a solar power panel, and other similar electrical energy sources. The secondary power may refer to electrical energy provided by one or more secondary power sources internal to or inside of each of the plurality of security devices. For example, the secondary power source may be physically internal to or inside of each of the plurality of security devices. The one or more secondary power sources may comprise a lithium metal battery, a lithium-ion battery, a lithium-polymer battery, an alkaline battery, a nickel-metal hydride battery, an integrated photovoltaic (solar), or other similar electrical energy sources.

As described above, the electrical power provided by the power outlets for the primary power source may comprise AC power and/or DC power. For example, security devices may be connected to standard electrical outlets providing AC power. Alternatively or additionally, security devices may be connected to non-standard power outlets providing DC power. Examples of non-standard power outlets providing DC power may include, but are not limited to, USB outlets (or USB port outlets), DC microgrids, and direct DC power distribution. For example, USB outlets may provide low-voltage DC power to the devices such as smartphones, tablets, and sensors. The USB outlets may be powered by AC-to-DC converters in the outlet. In case security devices are powered by the non-standard power outlets (e.g., USB outlets) providing DC power, the power source providing power to the security devices may be referred to as a primary power source.

At 410, a first query may be sent. For example, a first device of the plurality of security devices may send the first query to a second device of the plurality of security devices. For example, the first query may be sent based on the change in the power source providing power to the first device. The power source providing power to the first device may change from a primary power source providing primary power (e.g., AC power) to a secondary power source providing secondary power (e.g., battery power). The first query may include a request for an indication of the power source providing power to the second device. The second device may determine the power source currently providing power to the second device based on receiving the first query from the first device.

The first device may be configured to be powered by a primary power source and a secondary power source. For example, the first device may receive electrical power from a primary power source, such as AC power, and a secondary power source, such as one or more batteries. The first device may be configured to operate under primary power from the primary power source or secondary power from the secondary power source. For example, the first device may operate based on power received from either the primary power source or the secondary power source. The primary power source may be a power source external to the first device. The secondary power source may be a power source internal to or inside of the first device.

Similar to the first device, the second device may be configured to be powered by the primary power source and a secondary power. For example, the second device may receive electrical power from the primary power source, such as AC power, and a secondary power source, such as one or more batteries. The second device may be configured to operate under primary power from a primary power source or secondary power from a secondary power source. For example, the second device may operate based on power received from either the primary power source or the secondary power source. The primary power source may be a power source external to the second device. The secondary power source may be a power source internal to or inside of the second device. The first device and the second device may be associated with the security network. One or more of the first device or the second device may comprise a control panel, a sensor, a security camera, a security alarm, a smart lock, or a network device for the security network.

At 420, a first response may be received. For example, the first device may receive, from the second device, the first response. The first response may indicate the power source currently providing power to the second device. For example, the response may indicate the power source currently providing power to the second device is the primary power source (e.g., AC power). For example, the primary power source may comprise one or more of an AC-DC power supply, an AC power source, a DC power source, or a solar power panel. In another example, the response may indicate the power source providing power to the second device is the secondary power source (e.g., battery). For example, the secondary power source may comprise one or more of a lithium metal battery, a lithium-ion battery, a lithium-polymer battery, an alkaline battery, a nickel-metal hydride battery, or an integrated photovoltaic.

At 430, an indication of a tamper of the first device may be sent. For example, the first device may send the indication based on the power source providing power to the second device. For example, based on the response indicating the power source providing power to the second device is the primary power source, the first device may determine that the primary power source of the first device, or the first device itself, is compromised or has been tampered with. Based on determining that the power source of the first device, or the first device itself, is compromised or has been tampered with, the first device may send the indication indicating that the first device is compromised and/or has been tampered with.

In another example, based on response indicating that the power source providing power to the second device is the secondary power source, the first device may determine that the primary power source of the first device, or the first device itself, has not been compromised or tampered with. Based on determining that the primary power source providing power to the first device, or the first device itself, is not compromised or has not been tampered with, the first device may or may not send an indication indicating that the first device, or the primary power, is not compromised or has not been tampered with. The first device may or may not send the indication (e.g., power/network outage) to one or more of other security devices within the security system, a user device (e.g., a mobile device) and/or a computing device (e.g., a server) out of the security system/network.

Figure 5:
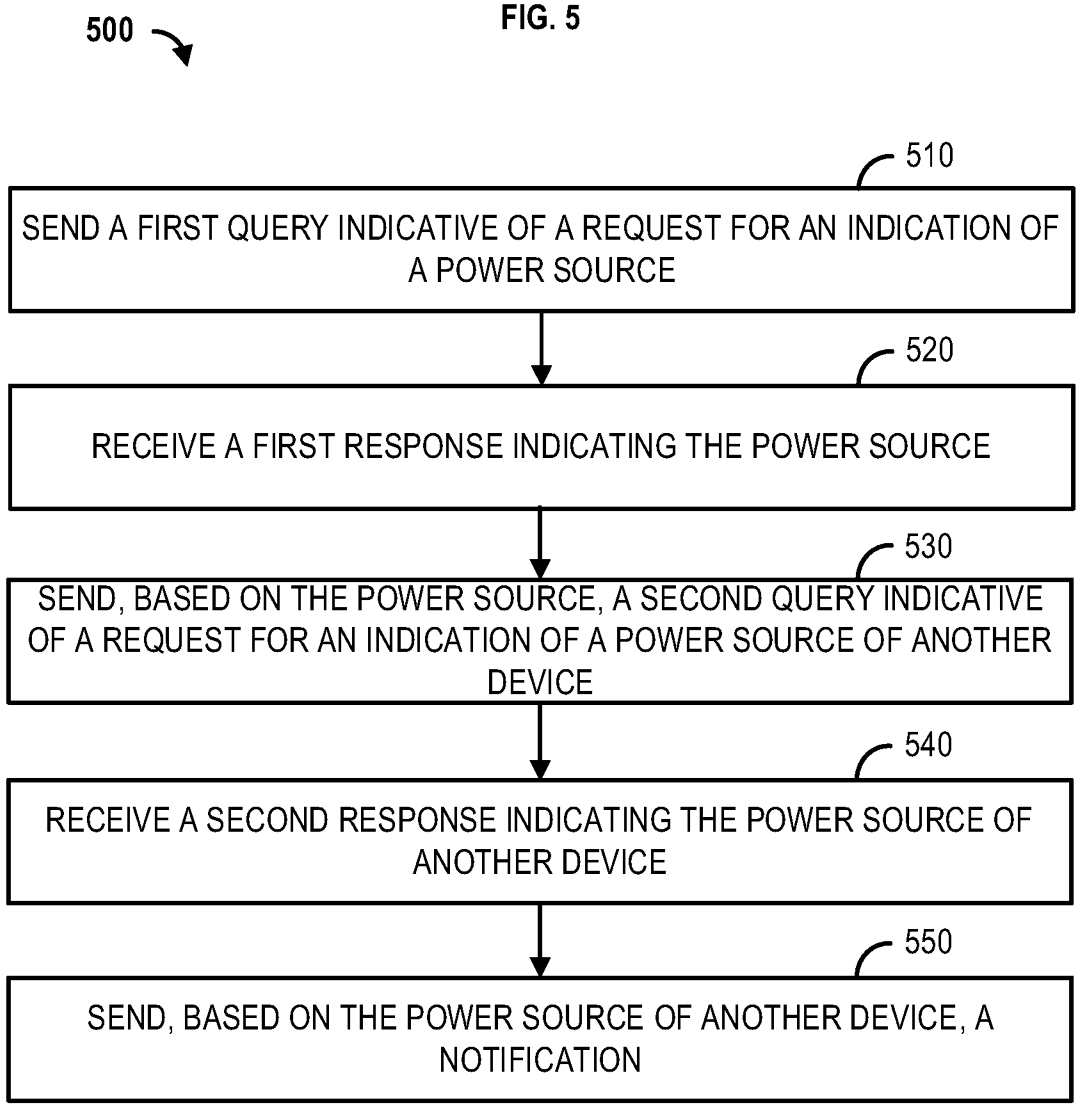
FIG. 5 shows a flowchart of an example method.

FIG. 5 shows an example flowchart 500 for detecting tampering in a security system/network. The security system/network may be a home security system/network, a business security system/network, a private security system/network, a public security system/network, or the like. The security system/network may comprise a plurality of security devices. Examples of the plurality of security devices may include, but are not limited to, a control panel, a router, a repeater, a gateway, an access point, a door/window sensor, a motion sensor, a glass break sensor, a smoke detector, a carbon monoxide detector, a flood and water leak sensor, a heat sensor, an environmental sensor, a security camera, a smart lock, and an alarm. One or more of the plurality of security devices may be configured to receive primary power from a primary power source and/or secondary power from a secondary power source (e.g., by one or more backup batteries). One or more of the plurality of security devices may be configured to operate based on one or more primary power sources providing primary power and/or one or more secondary power sources providing secondary power. One or more of the plurality of security devices may stop receiving the primary power from the primary power source (e.g., the main AC power) due to a power/network outage or a local event, such as a tampering attempt. One or more of the plurality of security devices may determine whether the particular device no longer receiving the primary power from the primary power source is due to the power/network outage or the local event, such as the tampering attempt (e.g., unplugging the one or more security devices from an electrical socket providing the primary power from the primary power source or otherwise disconnecting the one or more security devices from the primary power source).

As described above, the primary power source may refer to electrical energy provided by one or more power sources external to each of the plurality of security devices. For example, the primary power may be provided by the primary power source based on physical connections (e.g., a plug and electrical socket or wired connection) to each of the plurality of security devices. The one or more primary power sources may comprise an AC-DC power supply, an AC power source (e.g., 120V AC outlet or 220V AC outlet), a DC power source (e.g., 5V DC USB outlet), a solar power panel, and other similar electrical energy sources. The secondary power may refer to electrical energy provided by one or more secondary power sources internal to or inside of each of the plurality of security devices. For example, the secondary power source may be physically internal to or inside of each of the plurality of security devices. The one or more secondary power sources may comprise a lithium metal battery, a lithium-ion battery, a lithium-polymer battery, an alkaline battery, a nickel-metal hydride battery, an integrated photovoltaic (solar), and other similar electrical energy sources.

The electrical power provided by the power outlets for the primary power source may comprise AC power and/or DC power. For example, security devices may be connected to standard power outlets providing AC power. Alternatively or additionally, security devices may be connected to non-standard power outlets providing DC power. Examples of non-standard power outlets providing DC power may include, but are not limited to, USB outlets (or USB port outlets), DC microgrids, and direct DC power distribution. For example, USB outlets may provide low-voltage DC power to the devices such as smartphones, tablets, and sensors. The USB outlets may be powered by AC-to-DC converters in the outlet. In case security devices are powered by the non-standard power outlets (e.g., USB outlets) providing DC power, the power source providing power to the security devices may be referred to as disclosure primary power source.

At 510, a first query may be sent. For example, a first device of the plurality of security devices may send the first query to a second device of the plurality of security devices. For example, the first query may be sent based on the change in the power source providing power to the first device. The power source providing power to the first device may change from a primary power source providing primary power (e.g., AC power) to a secondary power source providing secondary power (e.g., battery power). The first query may include a request for an indication of the power source currently providing power to the second device. The second device may determine the power source currently providing power to the second device based on receiving the first query from the first device.

The first device may be configured to be powered by the primary power source and the secondary power source. For example, the first device may receive electrical power from a primary power source, such as AC power, and a secondary power source, such as one or more batteries. The first device may be configured to operate under primary power from the primary power source or secondary power from the secondary power source. For example, the first device may operate based on power received from either the primary power source or the secondary power source. The primary power source may be a power source external to the first device. The secondary power source may be a power source internal to or inside of the first device.

Similar to the first device, the second device may be configured to be powered by the primary power source and a secondary power source. For example, the second device may receive electrical power from a primary power source, such as AC power, and a secondary power source, such as one or more batteries. The second device may be configured to operate under primary power from a primary power source or secondary power from the secondary power source. For example, the second device may operate based on power received from either the primary power source or the secondary power source. The primary power source may be a power source external to the second device. The secondary power source may be a power source internal to the second device.

At 520, a first response may be received. For example, the first device may receive, from the second device, the first response. For example, the second device may send the first response to the first device based on receiving the first query. The first response may indicate the power source currently providing power to the second device. For example, the first response may indicate the power source currently providing power to the second device is the secondary power source (e.g., battery power). Based on the first response indicating the power source currently providing power to the second device is the secondary power source, the first device may send a second query to another device of the plurality of security devices to confirm that a power outage associated with or for the primary power source has occurred.

At 530, a second query may be sent. For example, the first device may send the second query. For example, the first device may send the second query to a third device of the plurality of security devices. For example, the second query may be sent to the third device based on the first response indicating the power source currently providing power to the second device is the secondary power source. The second query may include a request for an indication of the power source currently providing power to the third device.

The third device may be configured to be powered by the primary power source and a secondary power source. For example, the third device may receive electrical power from a primary power source, such as AC power, and a secondary power source, such as one or more batteries. The third device may be configured to operate under primary power from the primary power source or secondary power from the secondary power source. For example, the third device may operate based on power received from either the primary power source or the secondary power source. The primary power source may be a power source external to the third device. The secondary power source may be a power source internal to or inside of the third device. The first device, the second device, and the third device may be associated with the security network. One or more of the first device, the second device, or the third device may comprise a control panel, a sensor, a security camera, a security alarm, a smart lock, or a network device for the security network.

At 540, a second response may be received. For example, the first device may receive, from the third device, the second response. For example, the third device may send the second response to the first device. The second response may indicate the power source currently providing power to the third device. For example, the second response may indicate the power source currently providing power to the third device is the primary power source (e.g., AC power). For example, the primary power may comprise one or more of an AC-DC power supply, an AC power source, a DC power source, or a solar power panel. In another example, the second response may indicate the power source currently providing power to the second device is the secondary power source (e.g., battery). The secondary power source may comprise one or more of a lithium metal battery, a lithium-ion battery, a lithium-polymer battery, an alkaline battery, a nickel-metal hydride battery, or an integrated photovoltaic.

At 550, a notification may be sent. For example, the first device may send the notification based on the power source currently providing power to the third device. For example, based on the indication that the power source currently providing power to the third device being the primary power source, the first device may determine that the primary power source of the first device, or the first device itself, is compromised or has been tampered with. Based on determining that the primary power source of the first device, or the first device itself, is compromised or has been tampered with, the first device may send the notification indicating that the first device is compromised and/or has been tampered with. In another example, based on the indication that the power source currently providing power to the third device being the secondary power source, the first device may confirm that the primary power source of the first device, or the first device itself, is not compromised or has not been tampered with. Based on determining that the primary power source providing power to the first device, or the first device itself, is not compromised or has not been tampered with, the first device may send the notification indicating that the first device is not compromised and/or has not been tampered with. The first device may send the notification to one or more associated or other security devices within the security system, a user device (e.g., a mobile device) and/or a computing device (e.g., a server) out of the security system/network.

Figure 6:
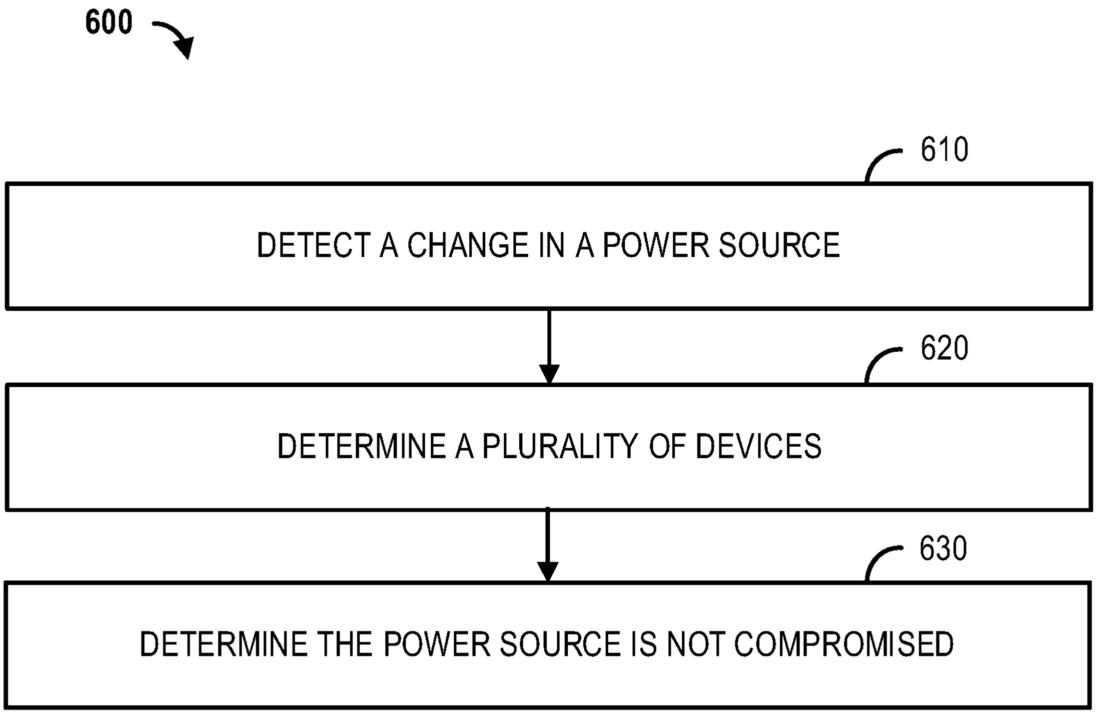
FIG. 6 shows a flowchart of an example method.

FIG. 6 shows an example flowchart 600 for detecting tampering in a security system/network. The security system/network may be a home security system/network, a business security system/network, a private security system/network, a public security system/network, or the like. The security system/network may comprise a plurality of devices. Examples of the plurality of devices may include, but are not limited to, a control panel, a router, a repeater, a gateway, an access point, a door/window sensor, a motion sensor, a glass break sensor, a smoke detector, a carbon monoxide detector, a flood and water leak sensor, a heat sensor, an environmental sensor, a security camera, a smart lock, and an alarm. One or more of the plurality of devices may be configured to receive primary power from a primary power source and secondary power from a secondary power source (e.g., a backup battery power). One or more of the plurality of devices may operate based on one or more primary power sources providing primary power or one or more secondary power sources providing secondary power. One or more of the plurality of devices may not be configured with, and thus not able to receive secondary power from, a secondary power source (e.g., a backup battery) but is only able to receive primary power from the primary power source. In this case, the one or more devices not configured with the secondary power source may operate only based on receiving primary power from one or more primary power sources. One or more of the plurality of devices may no longer receive primary power from the primary power source (e.g., the main AC power) due to a power/network outage or a local event, such as a tampering attempt (e.g., unplugging the one or more devices from an electrical socket providing the primary power from the primary power source or otherwise disconnecting the one or more devices from the primary power source). One or more of the plurality of devices may determine whether the particular device no longer receiving primary power from the primary power source is due to the power/network outage or the local event such as a tampering attempt (e.g., unplugging the one or more of the plurality of devices from an electrical socket providing primary power or otherwise disconnecting the one or more of the plurality of devices from the primary power source).

As described above, the primary power source may refer to electrical energy provided by one or more power sources external to each of the plurality of devices. For example, the primary power may be provided by the primary power source based on physical connections (e.g., a plug and electrical socket or wired connection) to each of the plurality of devices. The one or more primary power sources may comprise an AC-DC power supply, an AC power source (e.g., 120V AC outlet or 220V AC outlet), a DC power source (e.g., 5V DC USB outlet), a solar power panel, and other similar electrical energy sources. The secondary power source may refer to electrical energy provided by one or more power sources internal to or inside of each of the plurality of devices. For example, the secondary power may be provided by the secondary power source physically internal to or inside of each of the plurality of security devices. The one or more secondary power sources may comprise a lithium metal battery, a lithium-ion battery, a lithium-polymer battery, an alkaline battery, a nickel-metal hydride battery, an integrated photovoltaic (solar), and other similar electrical energy sources.

The electrical power provided by the power outlets for the primary power source may comprise AC power and/or DC power. For example, security devices may be connected to standard electrical outlets providing primary power in the form of AC power. Alternatively or additionally, security devices may be connected to non-standard power outlets providing DC power. Examples of non-standard power outlets providing DC power may include, but are not limited to, USB outlets (or USB port outlets), DC microgrids, and direct DC power distribution. For example, USB outlets may provide low-voltage DC power to the devices such as smartphones, tablets, and sensors. The USB outlets may be powered by AC-to-DC converters in the outlet. In case security devices are powered by the non-standard power outlets (e.g., USB outlets) providing DC power, the power source providing power to the security devices may be referred to as disclosure primary power source.

At 610, a change in a power source may be detected. For example, a first device of the plurality of devices may detect the change in the power source providing power to the first device. The first device may be configured to receive power from the primary power source and a secondary power source. For example, the first device may receive electrical power from the primary power source, such as AC power, and the secondary power source, such as one or more batteries. The first device may be configured to operate under primary power from the primary power source or secondary power from the secondary power source. For example, the first device may operate based on power received from either the primary power source or the secondary power source. The primary power source may be a power source external to the first device. The secondary power source may be a power source internal to or inside of the first device.

The detection of a change in the power source providing power to the first device may indicate the first device, which was drawing power from the primary power source, has changed to drawing power from the secondary power source. For example, the first device may change from receiving power from the primary power source to receiving power from the secondary power source due to a power/network outage associated with the primary power source or the local event such as a tampering attempt (e.g., unplugging the first device from an electrical socket or otherwise disconnecting the first device from the primary power source).

At 620, a plurality of devices associated with and/or within wireless communication range of the first device may be determined. For example, the first device may determine a list of the plurality of devices associated with and/or within the wireless communication range of the first device. The first device may determine the list of the plurality of devices based on device-to-device communication or the like. For example, the first device may directly communicate with each of the plurality of devices using various communication protocols such as Message Queuing Telemetry Transport (MQTT), Constrained Application Protocol (CoAP), and/or Hypertext Transfer Protocol (HTTP). The first device may communicate with each of the plurality of devices using protocols such as WiFi or Ethernet. The first device may generate the list of at least a portion of the plurality of devices based on one or more responses received from all or the at least the portion of plurality of devices. For example, the first device may send a query or a request to each of the plurality of devices. For example, the first device may send the query or request based on the change or detecting the change in the power source providing power to the first device from the primary power source to the secondary power source. If the first device receives a response from a device of the plurality of device within a predetermined amount of time, the first device may add the device in the list of the plurality of devices. The list of the plurality of devices providing a response to the query or request from the first device may be referred to as the list of a plurality of responding devices. The predetermined amount of time may be anywhere between 1 millisecond to 1 day At 630, whether the power source of the first device has been compromised or tampered with may be determined. For example, the first device may determine that the primary power source providing power to the first device, or the first device itself, is not tampered with or compromised based on the absence of a type of device in the plurality of devices providing a response to query or request from the first device (e.g., in the list of the plurality of responding devices). Each of the plurality of responding devices may be configured to receive power from the primary power source and the secondary power source. One or more devices that did not provide a response to the query or request from the first device are not be able to receive secondary power from a secondary power source but are only able to receive primary power from the primary power source. Thus, the type of device may comprise a primary and secondary power-capable type and a primary power only type. If the types of devices included in the plurality of responding devices (e.g., determined at 620) are only primary and secondary power-capable types of devices, the first device may determine that there is a power/network outage associated with the primary power source and the primary power source of the first device, or the first device itself, is not tampered with or compromised. In other words, if the types of devices included in the plurality of responding devices (e.g., determined at 620) do not include the primary power only device type, the first device may determine that there is a power/network outage associated with the primary power source and the primary power source of the first device, or the first device itself, is not tampered with or compromised. The absence of the primary power only types within the plurality of responding devices may indicate that there is a power/network outage associated with the primary power source and thus the power/network outage is the basis for why the first device changed from receiving primary power from the primary power source to receiving secondary power from the secondary power source.

For example, a first device of the plurality of devices may detect the change from the primary power source providing power to the first device to the secondary power source providing power to the first device. The first device may operate based on a primary power source providing primary power (e.g., AC power) or a secondary power source providing secondary power (e.g., battery power). The power source for the first device may change from the primary power source providing the primary power to the secondary power source providing the secondary power. Based on the change in the power source for the first device, the first device may send a query to a second device of the plurality of devices. The query may include a request for the power source currently providing power to the second device or any request that triggers a response from the second device. The second device may be configured to operate only based on the primary power source providing the primary power. For example, the second device may be a gateway, router, or access point that only receives electrical power from the primary power source. If the first device receives a response from the second device to the request sent to the second device, the first device may determine that there is not a power outage associated with the primary power source and the primary power source that was providing power to the first device, or the first device itself, has been tampered with or compromised. The response received from the second device may indicate to the first device that the second device is still currently receiving electrical power from the primary power source. The response needs to be received from the second device, and may be received within a time period/window/interval/duration. If the first device does not receive a response from the second device within the time period/window/interval/duration, the first device may determine that the second device is not currently receiving power from the primary power source and that there is a power outage associated with the primary power source, and the primary power source providing power to the first device, or the first device itself, has not been tampered with or compromised because the second device is not currently receiving electrical power from the primary power source.

Figure 7:
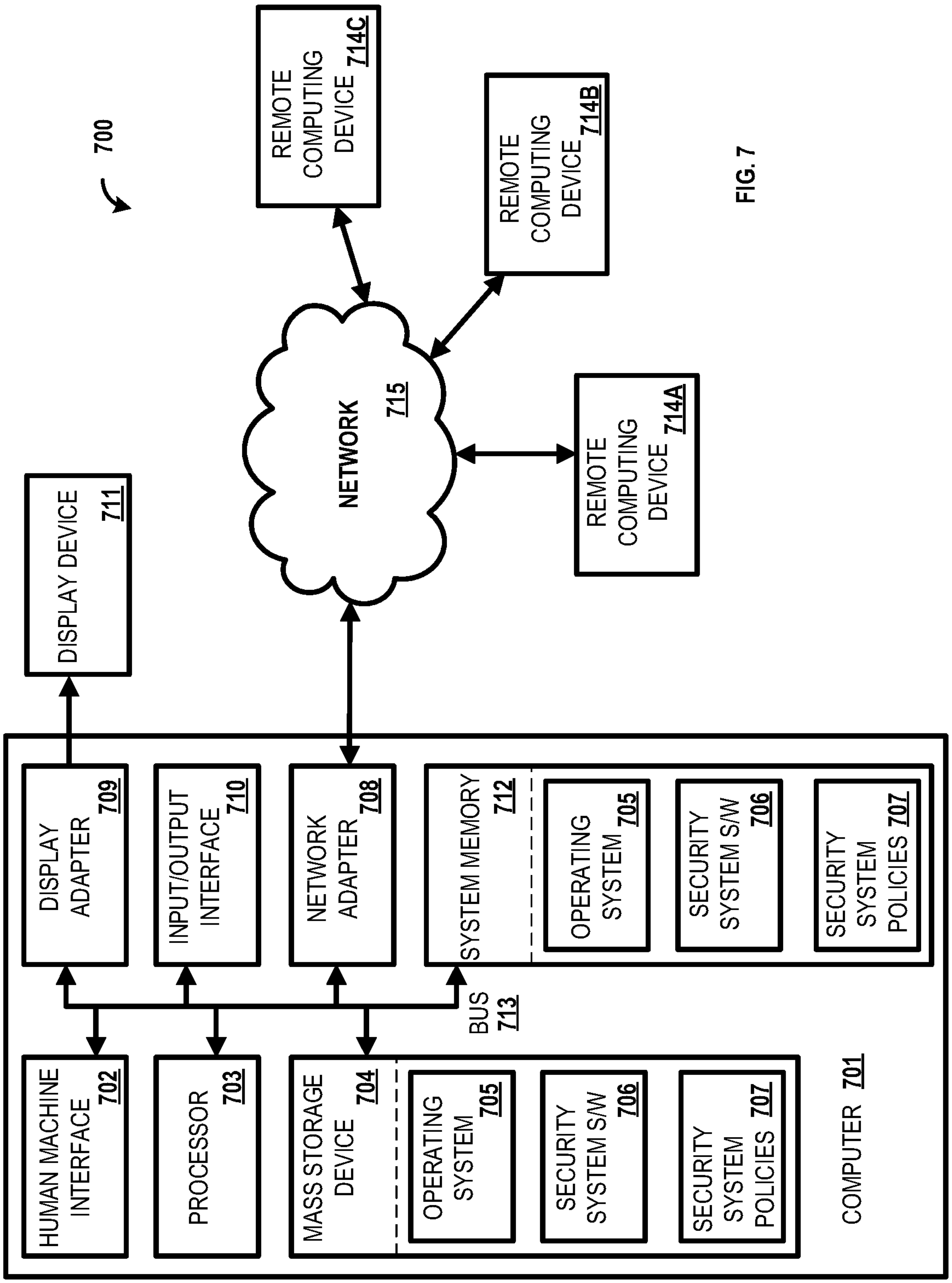
FIG. 7 shows a block diagram of an example computing device.

The methods described herein may be implemented on a computer 701 as illustrated in FIG. 7 and described below. By way of example, the devices 1-3 120A-C, the control unit 130, the wireless router 150, and the modem 160 of FIG. 1 and the user device 202, the network device 216A-B, and the computing device 204 of FIG. 2 may each be a computer 701 as illustrated in FIG. 7. Similarly, the methods described herein may utilize one or more computers to perform one or more functions in one or more locations. FIG. 7 is a block diagram 700 illustrating an operating environment for performing the described methods. This operating environment is only an example of an operating environment and is not intended to suggest any limitation as to the scope of use or functionality of operating environment architecture. Neither should the operating environment be interpreted as having any dependency or requirement relating to any one or combination of components illustrated in the operating environment.

The present security system tamper detection may be operational with numerous other general purpose or special purpose computing system environments or configurations. Examples of well-known computing systems, environments, and/or configurations that may be suitable for use with the systems and methods may comprise, but are not limited to, network devices, security devices, personal computers, server computers, laptop devices, and multiprocessor systems. Additional examples may comprise programmable consumer electronics, network PCs, minicomputers, mainframe computers, distributed computing environments that comprise any of the above systems or devices, and the like.

The processing of the described methods may be performed by software components. The described systems and methods may be described in the general context of computer-executable instructions, such as program modules, being executed by one or more computers or other devices.

Generally, program modules comprise computer code, routines, programs, objects, components, data structures, etc. that perform particular tasks or implement particular abstract data types. The described methods may also be practiced in grid-based and distributed computing environments where tasks are performed by remote processing devices that are linked through a communications network. In a distributed computing environment, program modules may be located in both local and remote computer storage media including memory storage devices.

Further, one skilled in the art will appreciate that the systems and methods described herein may be implemented via a general-purpose computing device in the form of a computer 701. The components of the computer 701 may comprise, but are not limited to, one or more processors or processing units 703, a system memory 712, and a system bus 713 that couples various system components including the processing unit 703 to the system memory 712. In the case of multiple processing units 703, the system may utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI), a PCI-Express bus, a Personal Computer Memory Card Industry Association (PCMCIA), Universal Serial Bus (USB) and the like. The bus 713, and all buses specified in this description may also be implemented over a wired or wireless network connection and each of the subsystems, including the processing unit 703, a mass storage device 704, an operating system 705, security system software 706, security system policies 707, a network adapter 708, system memory 712, an Input/Output Interface 710, a display adapter 709, a display device 711, and a human-machine interface 702, may be contained within one or more remote computing devices 714*a,b,c* at physically separate locations, connected through buses of this form, in effect implementing a fully distributed system.

The computer 701 typically comprises a variety of computer-readable media. Examples of computer-readable media may be any available media that is accessible by the computer 701 and comprises, for example, both volatile and non-volatile media, removable and non-removable media. The system memory 712 comprises computer-readable media in the form of volatile memory, such as random access memory (RAM), and/or non-volatile memory, such as read only memory (ROM). The system memory 712 typically contains data such as security system policies 707 and/or program modules such as operating system 705 and security system software 706 that are immediately accessible to and/or are presently operated on by the processing unit 703. The security system software 706 may perform the security system tamper detection methods described in FIGS. 3-6.

In another aspect, the computer 701 may also comprise other removable/non-removable, volatile/non-volatile computer storage media. By way of example, FIG. 7 illustrates a mass storage device 704 which may provide non-volatile storage of computer code, computer-readable instructions, data structures, program modules, and other data for the computer 701. For example, a mass storage device 704 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 704, including by way of example, an operating system 705 and security system software 706. Each of the operating system 705 and security system software 706 (or some combination thereof) may comprise elements of the programming and the security system software 706. Security system policies 707 may also be stored on the mass storage device 704. Security system policies 707 may be stored in any of one or more databases known in the art. Examples of such databases may comprise, DB2®, Microsoft® Access, Microsoft® SQL Server, Oracle®, mySQL, PostgreSQL, Mongo DB, Riak, HBase, Cassandra, and the like. The databases may be centralized or distributed across multiple systems.

In another aspect, the user may enter commands and information into the computer 701 via an input device (not shown). Examples of such input devices may comprise, but are not limited to, a keyboard, a pointing device (e.g., a "mouse"), a microphone, a joystick, a scanner, tactile input devices such as gloves, and other body coverings, and the like These and other input devices may be connected to the processing unit 703 via a human-machine interface 702 that is in communication with the system bus 713, but may be connected by other interface and bus structures, such as a parallel port, game port, an IEEE 1394 Port (also known as a Firewire port), a serial port, or a universal serial bus (USB).

In yet another aspect, a display device 711 may also be connected to the system bus 713 via an interface, such as a display adapter 709. It is contemplated that the computer 701 may have more than one display adapter 709 and the computer 701 may have more than one display device 711. For example, a display device may be a monitor, an LCD (Liquid Crystal Display), or a projector. In addition to the display device 711, other output peripheral devices may comprise components such as speakers (not shown) and a printer (not shown) which may be connected to the computer 701 via Input/Output Interface 710. Any step and/or result of the methods may be output in any form to an output device. Such output may be any form of visual representation, including, but not limited to, textual, graphical, animation, audio, tactile, and the like. The display 711 and computer 701 may be part of one device, or separate devices.

The computer 701 may operate in a networked environment using logical connections to one or more remote computing devices 714*a*-*c*. By way of example, a remote computing device may be a network device, security device, personal computer, portable computer, smartphone, a server, a router, a network computer, a peer device or other common network node, and so on. Logical connections between the computer 701 and a remote computing device 714*a*-*c* may be made via a network 715, such as a local area network (LAN) and/or a general wide area network (WAN). Such network connections may be through a network adapter 708. A network adapter 708 may be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components reside at various times in different storage components of the computer 701, and are executed by the data processor(s) of the computer. An implementation of security system software 706 may be stored on or transmitted across some form of computer-readable media. Any of the described methods may be performed by computer-readable instructions embodied on computer-readable media. Computer-readable media may be any available media that may be accessed by a computer. By way of example and not meant to be limiting, computer-readable media may comprise "computer storage media" and "communications media." "Computer storage media" comprise volatile and non-volatile, removable and non-removable media implemented in any methods or technology for storage of information such as computer-readable instructions, data structures, program modules, or other data. Examples of computer storage media may comprise, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as examples only, with a true scope and spirit being indicated by the following claims.

What is claimed is:

1. A method comprising:

sending, by a first device, based on a change in a power source providing power to the first device, a first query to a second device, wherein the first query is indicative of a request for an indication of a power source providing power to the second device;

receiving, from the second device, a first response indicating the power source providing power to the second device; and sending, based on the power source providing power to the second device, an indication of a tamper of the first device.

2. The method of claim 1, wherein the first device is configured with primary power and secondary power, and configured to operate under the primary power or the secondary power, wherein the primary power is provided by a power source external to the first device and the secondary power is provided by a power source internal to the first device.

3. The method of claim 1, wherein the second device is configured with primary power and secondary power, and configured to operate under the primary power or the secondary power, wherein the primary power is provided by a power source external to the second device and the secondary power is provided by a power source internal to the second device.

4. The method of claim 1, further comprising:

determining, based on the indication that the power source providing power to the second device is a primary power source, that the power source of the first device is compromised; and wherein sending the indication of the tamper of the first device comprises sending, based on determining that the power source of the first device is compromised, the indication of the tamper of the first device.

5. The method of claim 4, wherein the primary power source comprises one or more of an alternating current-direct current (AC-DC) power supply, an AC power source, a DC power source, or a solar power panel.

6. The method of claim 1, further comprising:

determining, based on the indication that the power source providing power to the second device is a secondary power source, that the power source of the first device is not compromised.

7. The method of claim 6, wherein the secondary power source comprises one or more of a lithium metal battery, a lithium-ion battery, a lithium-polymer battery, an alkaline battery, a nickel-metal hydride battery, or an integrated photovoltaic.

8. The method of claim 1, wherein the first device and the second device are associated with a security network.

9. The method of claim 8, wherein one or more of the first device or the second device comprises a control panel, a sensor, a security camera, a security alarm, a smart lock, or a network device for the security network.

10. A method comprising:

sending, by a first device and to a second device, based on a change in a power source providing power to the first device, a first query, wherein the first query is indicative of a request for an indication of a power source providing power to the second device;

receiving, from the second device, a first response indicating that the power source providing power to the second device is a secondary power source for the second device;

sending, by the first device and to a third device, based on the power source providing power to the second device being the secondary power source, a second query, wherein the second query is indicative of a request for an indication of a power source providing power to the third device;

receiving, from the third device, a second response indicating the power source providing power to the third device; and sending, based on the power source providing power to the third device, a notification.

11. The method of claim 10, wherein the first device is configured with primary power and secondary power, and configured to operate under the primary power or the secondary power, wherein the primary power is provided by a power source external to the first device and the secondary power is provided by a power source internal to the first device.

12. The method of claim 10, wherein the second device is configured with primary power and secondary power, and configured to operate under the primary power or the secondary power, wherein the primary power is provided by a power source external to the second device and the secondary power is provided by a power source internal to the second device.

13. The method of claim 10, wherein the third device is configured with primary power and secondary power, and configured to operate under the primary power or the secondary power, wherein the primary power is provided by a power source external to the third device and the secondary power is provided by a power source internal to the third device.

14. The method of claim 10, further comprising:

determining, based on the indication that the power source providing power to the third device is a primary power source, that the power source of the first device is compromised; and wherein sending the notification comprises sending, based on determining the power source of the first device is compromised, the notification indicating that the first device is compromised.

15. The method of claim 10, wherein the first device, the second device, and the third device are associated with a security network.

16. A method comprising:

detecting, by a first device, a change from a first power source to a second power source providing power to the first device;

sending, by the first device, a query to a second device;

receiving, from the second device, a response indicating that the second device has power provided by the first power source; and sending, based on the response, an indication that the first device is compromised.

17. The method of claim 16, wherein the first device is configured to operate under the first power source or the second power source, wherein the first power source is external to the first device and the second power source is internal to the first device.

18. The method of claim 16, wherein the second device is configured to operate only under the first power source.

19. The method of claim 16, wherein sending the indication that the first device is compromised is based on the response being received from the second device within a predetermined amount of time.

20. The method of claim 16, wherein the first device and the second device are associated with a security network.

* * * * *